United States Patent
Martinez et al.

(10) Patent No.: US 10,999,705 B2
(45) Date of Patent: May 4, 2021

(54) MOTION VECTOR IDENTIFICATION IN A WI-FI MOTION DETECTION SYSTEM

(71) Applicant: Aerial Technologies Inc., Montreal (CA)

(72) Inventors: Michel Allegue Martinez, Terrebonne (CA); Negar Ghourchian, Montreal (CA); David Grant, Santa Rosa Valley, CA (US); Francois Morel, Kirkland (CA); Pascal Paradis-Theberge, Montreal (CA)

(73) Assignee: AERIAL TECHNOLOGIES INC., Montreal (CA)

( * ) Notice: Subject to any disclaimer, the term of this patent is extended or adjusted under 35 U.S.C. 154(b) by 0 days.

(21) Appl. No.: 16/798,138

(22) Filed: Feb. 21, 2020

(65) Prior Publication Data

US 2020/0329343 A1   Oct. 15, 2020

Related U.S. Application Data

(60) Provisional application No. 62/809,347, filed on Feb. 22, 2019.

(51) Int. Cl.
*H04W 4/029* (2018.01)
*H04W 84/12* (2009.01)

(52) U.S. Cl.
CPC ............ *H04W 4/029* (2018.02); *H04W 84/12* (2013.01)

(58) Field of Classification Search
CPC ............................. H04W 4/029; H04W 84/12
See application file for complete search history.

(56) References Cited

U.S. PATENT DOCUMENTS

| | | | |
|---|---|---|---|
| 8,073,441 | B1 | 12/2011 | Unger et al. |
| 9,219,790 | B1 | 12/2015 | Filev et al. |
| 9,414,115 | B1 | 8/2016 | Mao et al. |
| 9,854,292 | B1 | 12/2017 | Matthews et al. |

(Continued)

FOREIGN PATENT DOCUMENTS

| | | |
|---|---|---|
| CA | 3044480 | 5/2018 |
| CN | 105828289 | 8/2016 |

(Continued)

OTHER PUBLICATIONS

Deng et al., "CC-DTW: An Accurate Indoor Fingerprinting Localization Using Calibrated Channel State Information and Modified Dynamic Time Warping", Sensors 19, No. 9: 1984, Apr. 28, 2019 (Apr. 28, 2019), [online] [retrieved on Aug. 20, 2020 (Aug. 20, 2020)], Retrieved from the internet: https://www.mdpif.com/1424-8220/19/9/1984.

(Continued)

*Primary Examiner* — Minjung Kim
(74) *Attorney, Agent, or Firm* — Polsinelli LLP

(57) ABSTRACT

Systems and methods for detecting small motion vectors in a Wi-Fi motion detection system are provided. A channel is monitored over time and then evaluated to see if there is a difference, or delta, between the current time sample and other similar time samples. The delta is compared to well-known historical data that is stored in a database and used as a baseline for no motion to identify what the small motion vector is. If the small motion vector activity can't be identified, a learning module is executed to determine the closest match.

15 Claims, 10 Drawing Sheets

(56) References Cited

U.S. PATENT DOCUMENTS

| | | | |
|---|---|---|---|
| 2006/0224938 | A1 | 10/2006 | Fikes et al. |
| 2007/0024580 | A1 | 2/2007 | Sands et al. |
| 2007/0266395 | A1 | 11/2007 | Lee et al. |
| 2010/0242063 | A1 | 9/2010 | Slaney et al. |
| 2011/0029277 | A1* | 2/2011 | Chowdhary ......... G01C 21/165 702/150 |
| 2011/0117924 | A1 | 5/2011 | Brunner et al. |
| 2011/0258039 | A1 | 10/2011 | Patwa et al. |
| 2012/0135733 | A1 | 5/2012 | Cormier et al. |
| 2012/0324494 | A1 | 12/2012 | Burger et al. |
| 2013/0014136 | A1 | 1/2013 | Bhatia et al. |
| 2013/0115974 | A1 | 5/2013 | Lee et al. |
| 2014/0033240 | A1 | 1/2014 | Card et al. |
| 2014/0223467 | A1 | 8/2014 | Hayton et al. |
| 2015/0026708 | A1 | 1/2015 | Ahmed et al. |
| 2015/0050923 | A1* | 2/2015 | Tu ......................... H04W 4/029 455/418 |
| 2015/0092747 | A1 | 4/2015 | Ganesan |
| 2015/0113556 | A1 | 4/2015 | Weast et al. |
| 2015/0365787 | A1 | 12/2015 | Farrell |
| 2016/0127766 | A1 | 5/2016 | Luk et al. |
| 2016/0174185 | A1 | 6/2016 | Ramakrishnan et al. |
| 2017/0135635 | A1* | 5/2017 | Bostick .................. A61B 5/681 |
| 2017/0160089 | A1* | 6/2017 | Jang ...................... H04W 4/029 |
| 2017/0332192 | A1 | 11/2017 | Edge |
| 2017/0366955 | A1 | 12/2017 | Edge |
| 2018/0181094 | A1 | 6/2018 | Funk et al. |
| 2018/0184165 | A1 | 6/2018 | Maughan et al. |
| 2018/0330406 | A1 | 11/2018 | Deluca et al. |
| 2019/0174170 | A1 | 6/2019 | Chen |
| 2019/0188756 | A1 | 6/2019 | Bradley et al. |
| 2020/0226388 | A1 | 7/2020 | Ghessassi |
| 2020/0292572 | A1 | 9/2020 | Bateni |
| 2020/0296463 | A1 | 9/2020 | Martinez |
| 2020/0302478 | A1 | 9/2020 | Martinez |
| 2020/0303046 | A1 | 9/2020 | Martinez |
| 2020/0327430 | A1 | 10/2020 | Martinez |
| 2020/0328793 | A1 | 10/2020 | Martinez |
| 2021/0063537 | A1 | 3/2021 | Martinez |

FOREIGN PATENT DOCUMENTS

| | | |
|---|---|---|
| WO | WO 2020/170221 | 8/2020 |
| WO | WO 2020/240526 | 12/2020 |

OTHER PUBLICATIONS

Ghourchian et al., "Real-Time Indoor Localization in Smart Homes Using Semi-Supervised Learning", Association for the Advancement of Artificial Intelligence, Twenty-Ninth AAAI Conference on Innovative Applications, pp. 4670-4677, Feb. 8, 2017 (Feb. 8, 2017), [online] [retrieved on Aug. 20, 2020 (Aug. 20, 2020)], Retrieved from the internet: https://aaai.org/ocs/index.php/IAAI/IAAI17/paer/view/15010.

Rui Zhou et al., "Device-free Localization Based on CSI Fingerprints and Deep Neural Networks", 15 Annual IEEE International Conference on Sensing, Communication, and Networking (SECON), Jun. 11, 2018 (Jun. 11, 2018), [online] [retrieved on Aug. 20, 2020 (Aug. 20, 2020] Retrieved from the internet: https://dl.acm.org/doi/10.1145/2639108.2639143.

Xuyu Wang et al., "CSI-Based Fingerprinting for Indoor Localization: A Deep Learning Approach", IEEE Transactions on Vehicular Technology, vol. 66, No. 1, pp. 763-776, Mar. 22, 2016 (Mar. 22, 2016), [online] [retrieved on Aug. 20, 2020 (Aug. 20, 2020), Retrieved from the internet: https://ieeexplore://ieeexplore.ieee.org/documents/7438932.

Yang Wang et al., "E-eyes: Device-free Location-oriented Activity Identification Using Fine-grained Wifi Signatures", MobiCom'14, pp. 617-628 Sep. 7, 2014 (Sep. 7, 2014), [retrieved on 20 Aug. 2020 (20/08/2020)], Retrieved from the internet: https://dl.acm.org/doi/10.1145/2639108.2639143.

PCT Application No. PCT/IB2020/0551863 International Search Report and Written Opinion dated Oct. 15, 2020.

PCT/IB2020/051503, Handling Concept Drift in Wi-Fi Based Localization, Feb. 22, 2020.

U.S. Appl. No. 16/796,662, Michel A. Martinez, Smart Media Display, filed Feb. 20, 2020.

U.S. Appl. No. 16/795,198, Michel A. Martinez, Advertisement Engagement Measurement, filed Feb. 19, 2020.

U.S. Appl. No. 16/794,668, Michel A. Martinez, Robotic H Matrix Creation, filed Feb. 19, 2020.

U.S. Appl. No. 16/798,319, Michel A. Martinez, Wi-Fi Based Condition Monitoring, filed Feb. 22, 2020.

U.S. Appl. No. 16/795,219, Michel A. Martinez, Self-Learning Based on Wi-Fi-Based Monitoring and Augmentation, filed Feb. 19, 2020.

U.S. Appl. No. 16/798,148, Seyedehsan Bateni Wireless Motion Detection Using Multiband Filters, filed Feb. 21, 2020.

U.S. Appl. No. 17/006,579, Michel A. Martinez System and Method for Presence and Pulse Detection From Wireless Systems, filed Aug. 28, 2020.

PCT Application No. PCT/IB2020/051503 International Search Report and Written Opinion dated Jul. 30, 2020.

U.S. Appl. No. 17/131,078, Michael A. Martinez, Monitoring Activity Using Wi-Fi Motion Detection, filed Dec. 22, 2020.

PCT Application No. PCT/1132020/060271 International Search Report and Written Opinion dated Feb. 15, 2021.

U.S. Appl. No. 16/796,662 Office Action dated Feb. 12, 2021.

* cited by examiner

| Sample Number | User | Sample Location | Sample Time | Sample Data |
|---|---|---|---|---|
| Sample 1 | User1 | Home | 12/13/18 1:00pm | NoMotionSampleUser1.dat |
| Sample 2 | User2 | Office | 1/15/18 3:00pm | NoMotionSampleUser2.dat |
| Sample 3 | User3 | Home | 12/18/18 2:00pm | NoMotionSampleUser3.dat |
| Sample 4 | User4 | Home | 1/10/18 6:00am | NoMotionSampleUser4.dat |

FIG. 2

| Trigger Activity | Trigger Location |
|---|---|
| Lying down | Bedroom |
| Lying down | Living room |
| Sitting down | Bedroom |
| Sitting down | Living room |
| Sitting down | Bathroom |
| Falling down | Any location |
| No motion | Any location |

FIG. 3

| Small Motion Vector Activity | Trigger Activity | Location | Time | Small Motion Vector Data |
|---|---|---|---|---|
| Breathing | Lying down | Bedroom | 9:00pm | SmallMotionVectorData1.dat |
| Heart rate | Lying down | Bedroom | 10:00pm | SmallMotionVectorData2.dat |
| Shaking | Lying down | Bedroom | 11:00pm | SmallMotionVectorData3.dat |
| Breathing | Lying down | Living room | 6:00am | SmallMotionVectorData4.dat |
| Heart rate | Lying down | Living room | 7:00am | SmallMotionVectorData5.dat |
| Shaking | Lying down | Living room | 8:00am | SmallMotionVectorData6.dat |
| Shaking | Falling down | Bedroom | 6:00pm | SmallMotionVectorData7.dat |
| Breathing | Sitting down | Living room | 12:00pm | SmallMotionVectorData8.dat |
| Heart rate | Sitting down | Living room | 1:00pm | SmallMotionVectorData9.dat |

FIG. 4

| Small Motion Vector Activity | Trigger Activity | Location | Time | Date | Small Motion Vector Event Data |
|---|---|---|---|---|---|
| Breathing | Lying down | Bedroom | 9:00pm | 12/28/18 | SmallMotionVectorEventData1.dat |
| Breathing | Lying down | Bedroom | 10:00pm | 12/28/18 | SmallMotionVectorEventData2.dat |
| Breathing | Lying down | Bedroom | 11:00pm | 12/28/18 | SmallMotionVectorEventData3.dat |
| Heart rate | Lying down | Bedroom | 10:00pm | 12/28/18 | SmallMotionVectorEventData4.dat |
| Shaking | Lying down | Bedroom | 11:00pm | 12/28/18 | SmallMotionVectorEventData5.dat |
| Breathing | Lying down | Living room | 6:00am | 12/19/18 | SmallMotionVectorEventData6.dat |
| Heart rate | Lying down | Living room | 7:00am | 12/19/18 | SmallMotionVectorEventData7.dat |
| Shaking | Lying down | Living room | 8:00am | 12/19/18 | SmallMotionVectorEventData8.dat |
| Shaking | Falling down | Bedroom | 6:00pm | 12/19/18 | SmallMotionVectorEventData9.dat |
| Breathing | Sitting down | Living room | 12:00pm | 12/19/18 | SmallMotionVectorEventData10.dat |
| Heart rate | Sitting down | Living room | 1:00pm | 12/19/18 | SmallMotionVectorEventData11.dat |
| Unknown event | Sitting down | Living room | 5:00pm | 12/18/18 | SmallMotionVectorEventData12.dat |

FIG. 5

MOTION VECTOR IDENTIFICATION IN A WI-FI MOTION DETECTION SYSTEM

CROSS-REFERENCE TO RELATED APPLICATIONS

The present patent application claims the priority benefit of U.S. Provisional Patent Application No. 62/809,347 filed Feb. 22, 2019 and titled "Micro Motion Identification in a Wi-Fi Motion Detection System," the disclosure of which is incorporated herein in its entirety.

BACKGROUND OF THE INVENTION

1. Field of the Invention

The present disclosure relates to identifying small motion vectors using a Wi-Fi motion detection system; more specifically, the present disclosure relates to identifying small motion vectors by comparing response data from a wireless access point.

2. Description of the Related Art

Motion detection is the process of detecting a change in the position of an object relative to its surroundings or a change in the surroundings relative to an object. Motion detection is usually a software-based monitoring algorithm which, for example when it detects motions will signal the surveillance camera to begin capturing the event. An advanced motion detection surveillance system can analyze the type of motion to see if it warrants an alarm.

Wi-Fi location determination, also known as Wi-Fi localization or Wi-Fi location estimation refers to methods of translating observed Wi-Fi signal strengths into locations. A "radio map," consisting of sets of metadata containing information about the frequency response of the channel, and/or phase response of the channel, and/or impulse response of the channel, and/or received signal strength indicators (RSSI), and/or any other statistic that describes the wireless communication link between paired devices is stored as a "profile" to be compared later to a signal scan to recognize the location of the device doing the scanning.

SUMMARY OF THE CLAIMED INVENTION

Embodiments of the present invention allow for a Wi-Fi motion detection system to detect small motions that normally wouldn't be picked up in traditional security systems. A system is disclosed for detecting small motion vectors comprising comparing the monitored impulse response of a channel data to a known sample of data that is known to have no motion. The system evaluates the differences between the monitored data and the sample. The system includes a historical sample database, a trigger database, a small motion vector database, a micro event database, and a base module. The base module includes a trigger module, a delta module, a small motion vector ID module, and a learning module. The trigger module determines when a small motion vector may be starting and executes the delta module. The delta module monitors the impulse response of the channel and calculates small motion vectors by comparing it to a historical sample. The small motion vector activity is identified in the small motion vector ID module and if the small motion vector activity can't be identified the learning module is executed to determine the closest match.

BRIEF DESCRIPTIONS OF THE DRAWINGS

FIG. 2 illustrates an exemplary historical sample database.

FIG. 3 illustrates an exemplary trigger database.

FIG. 4 illustrates an exemplary small motion vector database.

FIG. 5 illustrates an exemplary small motion vector event database.

DETAILED DESCRIPTION

Systems and methods for detecting small motion vectors in a Wi-Fi motion detection system are provided. A channel is monitored over time and then evaluated to see if there is a difference, or delta, between the current time sample and other similar time samples. The delta is compared to well-known historical data that is stored in a database and used as a baseline for no motion to identify what the small motion vector is. If the small motion vector activity can't be identified, a learning module is executed to determine the closest match.

Figure 1:
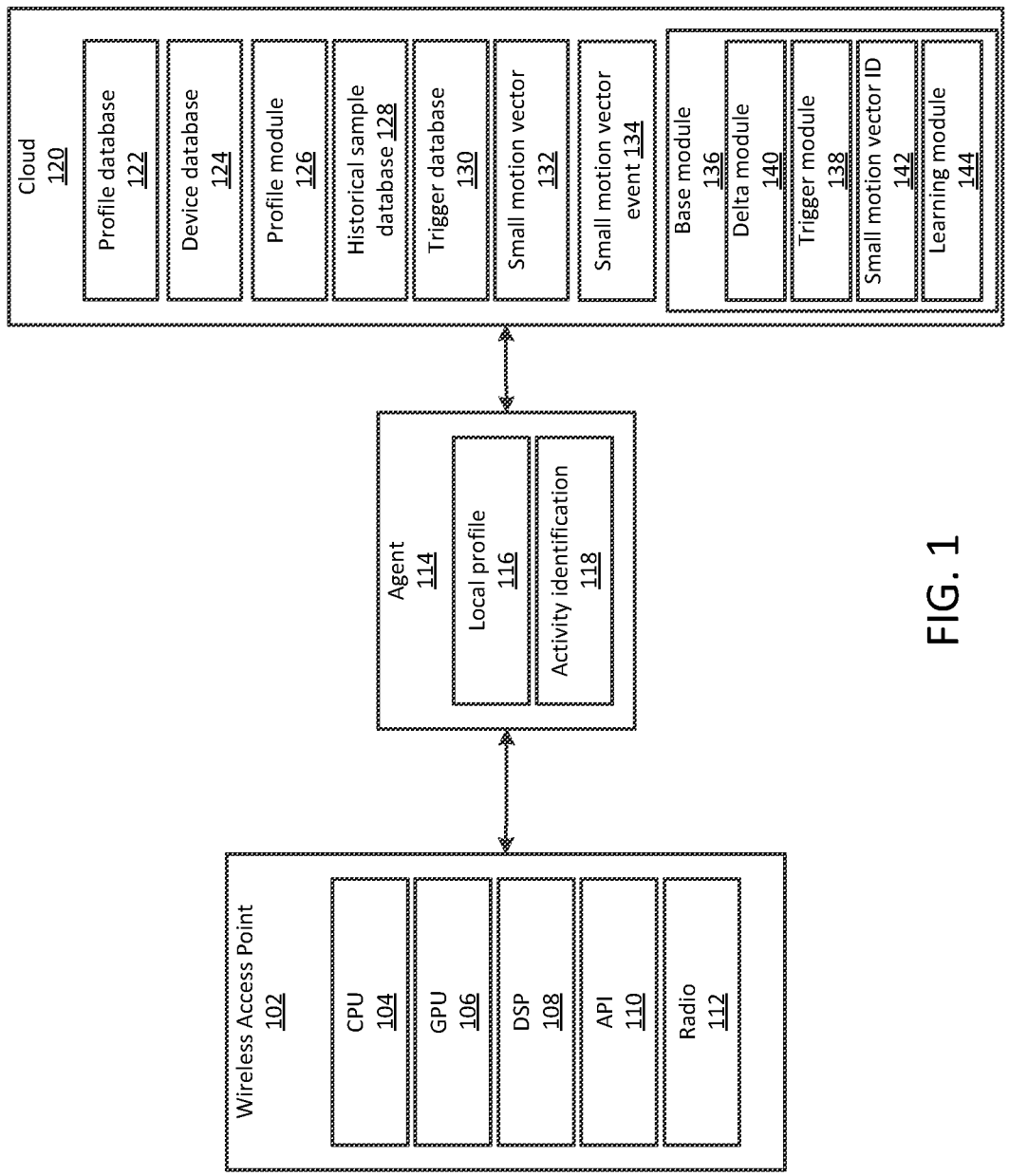
FIG. 1 illustrates an exemplary network environment in which a system for small motion vector detection system may be implemented.

FIG. 1 illustrates an exemplary network environment in which a system for small motion vector detection system may be implemented. As illustrated, the network environment includes a wireless access point 102 that may be a Wi-Fi access point. In one example, the wireless access point 102 is an 802.11ac or above access point. The wireless transceiver of the wireless access point 102 is in communication with the further stationary device over a corresponding further one of the at least one radio frequency communication link. The wireless access point 102 is configured to record a further channel state information data set for the further one of the at least one radio frequency communication link at a corresponding time. In an embodiment, determining the activity of the person in the environment includes determining the activity of the person in the environment based on a comparison of the further channel state information data set to each of the at least one channel state information profile of each of the plurality of activity profiles. In an embodiment, the activity is determined based on a sum of a similarity measurement of the channel state information data set and a similarity measurement of the further channel state information data set. A central processing unit (CPU) 104 is the electronic circuitry within a computer that carries out the instructions of a computer program by performing the basic arithmetic, logic, controlling and input/output (I/O) operations specified by the instructions. A graphics processing unit (GPU) 106 is a specialized electronic circuit designed to rapidly manipulate and alter memory to accelerate the creation of images in a frame buffer intended for output to a display device. GPUs 106 are used in embedded systems, mobile phones, personal computers, workstations, and game consoles. GPUs 106 are efficient at manipulating computer graphics and image processing. Their highly parallel structure makes them more efficient than general-purpose CPUs for algorithms that process large blocks of data in parallel. A digital signal processor (DSP) 108 is a specialized microprocessor (or a SIP block), with its architecture optimized for the operational needs of digital signal processing. DSP 108 may measure, filter or compress continuous real-world analog signals. An application program interface (API) 110 is a set of routines, protocols, and tools for building software applications. The API 110 specifies how software components should interact. APIs 110 are used when programming graphical user interface (GUI) components. The API 110 provides access to the channel state data to the agent 114. The wireless access point 102 compliant with either 802.11ac or above, using the stock omnidirectional antenna on a radio 112 might have a range of 100 m (0.062 mi). The radio 112 with an external semi parabolic antenna (15 dB gain) with a similarly equipped receiver at the far end may have a range over 20 miles.

An agent 114 is a device or module configured to collect data from the Wi-Fi chipset, filter the incoming data then feed and pass it to the cloud server 120 for activity identification. Depending on the configuration, the activity identification can be done on the edge, at the agent 114 level, or in the cloud server 120, or some combination of the two. A local profile database 116 is utilized when at least a portion of the activity identification is done on the edge. This could be a simple motion/no-motion determination profile, or a plurality of profiles for identifying activities, objects, individuals, biometrics, etc. An activity identification module 118 distinguishes between walking activities and in-place activities. In general, a walking activity causes significant pattern changes of the CSI, or impulse or frequency response of the channel amplitude over time, since it involves significant body movements and location changes. In contrast, an in-place activity (e.g., watching TV on a sofa) only involves relative smaller body movements and will not cause significant amplitude changes but presents certain repetitive patterns within the CSI or frequency or impulse response of the channel measurements.

A cloud server 120 analyzes and creates profiles describing various activities. A profile database 122 is utilized when at least a portion of the activity identification is done in the cloud server 120. This could be a simple motion/no-motion determination profile, or a plurality of profiles for identifying activities, objects, individuals, biometrics, etc. A device database 124 stores the device ID of all connected wireless access points 102. A profile module 126 monitors the data set resulting from continuous monitoring of a target environment, to identify multiple similar instances of an activity without a matching profile in such a data set, combine that data with user feedback to label the resulting clusters to define new profiles that are then added to the profile database 122.

The historical sample database 128 stores known impulse response data for different environments as a baseline for no motion. For example, the historical sample database 128 stores multiple samples of impulse response data of a user's home when the system knows that no one is home and there is not motion. This data is previously trained or added to the historical sample database 128. A trigger database 130 stores a list of activities or motions that can be identified by a Wi-Fi motion detection system and are typically followed by a period of no motion. As one example, one activity known to be followed by no motion is the activity of lying down or specifically lying down on a bed in a bedroom, it is known that lying down on a bed in a bedroom is followed by a period of time of no motion. A small motion vector database 132 stores impulse response data for small motion vectors that were calculated by finding the delta between monitored impulse response data from a target environment where there is no motion detected after a known trigger event and a historical sample of no motion data of the same environment. A small motion vector event database 134 stores the identified small motion vector activity and small motion vector data which can then be used or accessed by the user or other modules. As one example, the system may identify small motion vectors for breathing which might be used for respiratory rate by another health application.

A base module 136 executes all of the modules required for identifying, determining and learning small motion vectors from response data. The base module 136 first executes a trigger module 138 when the system is activated. The trigger module 138 continuously monitors the activity identification module 118 for an activity identification output and compares the identified activity to the trigger database 130 to determine if a trigger activity has happened. As one example, the trigger module 138 monitors activity identification module 118 and identifies the trigger activity of lying down. Once the trigger activity has been identified the trigger module 138 executes a delta module 140. The delta module 140 is executed by the trigger module 138 when a trigger activity is detected. The delta module 140 then begins to monitor the impulse response data for a period of time. The monitored data is then compared to historical sample data in the historical sample database 128 for the same environment. The delta between the two signals would be the calculated small motion vectors within the target environment. As one example, if a user is lying down, though they may not be moving, there are still small motion vector movements such as breathing. The delta module 140 would monitor this impulse data of the user lying down and then compare it to known historical data of no motion within the same environment. The delta between known historical sample data (i.e., no motion data) and the monitored motion data results in the small motion vectors, for this example the small motion vectors may be the breathing of the user. A small motion vector ID module 142 receives the determined small motion vector data from the delta module 140 and compares it to the small motion vector database 132 to determine what the small motion vector activity is (e.g., heart rate, breathing, coughing, sneezing, shaking, etc.). If the system doesn't find a match it will initiate the learning module 144 to teach the new small motion vector and add it to the small motion vector database 132. A learning module 144 uses user input and machine learning to identify a small motion vector. The learning module 144 uses correlation of location and time to find the closest match from previous data stored in the small motion vector database 132 and sends that to a user for input.

FIG. 2 illustrates an exemplary historical sample database. The historical sample database 128 stores well known impulse response data for different environments as a baseline for no motion. As one example, the historical sample database 128 stores multiple samples of impulse response data of a user's home when the system knows that no one is home.

FIG. 3 illustrates an exemplary trigger database. The trigger database 130 stores a list of activities or motions that can be identified by a Wi-Fi motion detection system and are typically followed by a period of no motion. As one example, one activity known to be followed by no motion is the activity of lying down or specifically lying down on a bed. It is known that lying down on a bed is followed by a period of time of no motion.

FIG. 4 illustrates an exemplary small motion vector database. The small motion vector database 132 stores impulse response data for small motion vectors that were calculated by determining the delta between monitored impulse response data from a target environment where there is no motion detected after a known trigger event and a historical sample of no motion data of the same environment. The small motion vector database 132 stores the location and time associated with each small motion vector activity. The small motion vector database 132 stores the trigger activity associated with each small motion vector activity.

FIG. 5 illustrates an exemplary small motion vector event database. The small motion vector event database 134 stores the identified small motion vector which can then be used or accessed by the user or other modules. As one example, the system may identify small motion vectors for breathing which might be used for respiratory rate by another health application. This data is very similar to the small motion vector database 132 but differs as it may have multiple entries for the same small motion vector activity, but they may be stored in the database at different times or dates.

Figure 6:
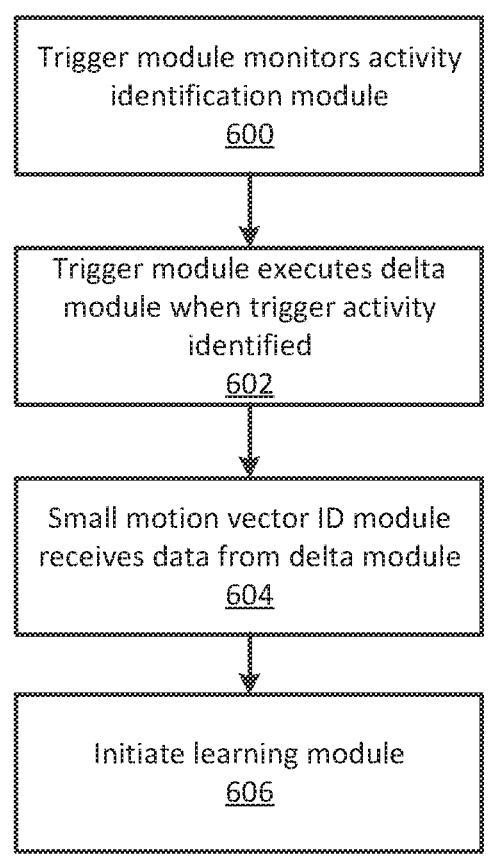
FIG. 6 is a flowchart illustrating an exemplary method for small motion vector detection.

FIG. 6 is a flowchart illustrating an exemplary method for small motion vector detection. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Such method for small motion vector detection may be performed based on execution of base module 136. The process begins at step 600, with the trigger module 138 continuously monitoring the activity identification module 118 for an activity identification output. The trigger module 138 compares the identified activity to the trigger database to determine if a trigger activity has happened. As one example, the trigger module 138 monitors activity identification module 118 and identifies the trigger activity of lying down.

Once the trigger activity has been identified, the trigger module 138 executes the delta module 140 at step 602. The delta module 140 is executed by the trigger module 138 when a trigger activity is detected. The delta module 140 then begins to monitor the impulse response data for a period of time. The monitored data is then compared to historical sample data for the same environment. The delta between the two signals would be the calculated small motion vectors within the target environment. As one example, if a user lays down, though they may not be moving there are still small motion vector movements such as breathing. The delta module 140 would monitor this impulse data of the user lying down and then compare it to known historical data of no motion within the same environment. The delta between known historical sample data (i.e., no motion data) and the monitored motion data results in the small motion vectors. As one example, the small motion vector may be the breathing of the user.

A small motion vector ID module 142 receives the determined small motion vector data from the delta module 140 and compares it to the small motion vector database 132 to determine what the small motion vector activity is at step 604. If the system doesn't find a match it will initiate the learning module 144 to teach the new small motion vector and add it to the small motion vector database 132. A learning module 144 uses user input and machine learning to identify a small motion vector. The learning module 144 uses correlation of location and time to find the closest match from previous data stored in the small motion vector database 132 and sends that to a user for input at step 606.

Figure 7:
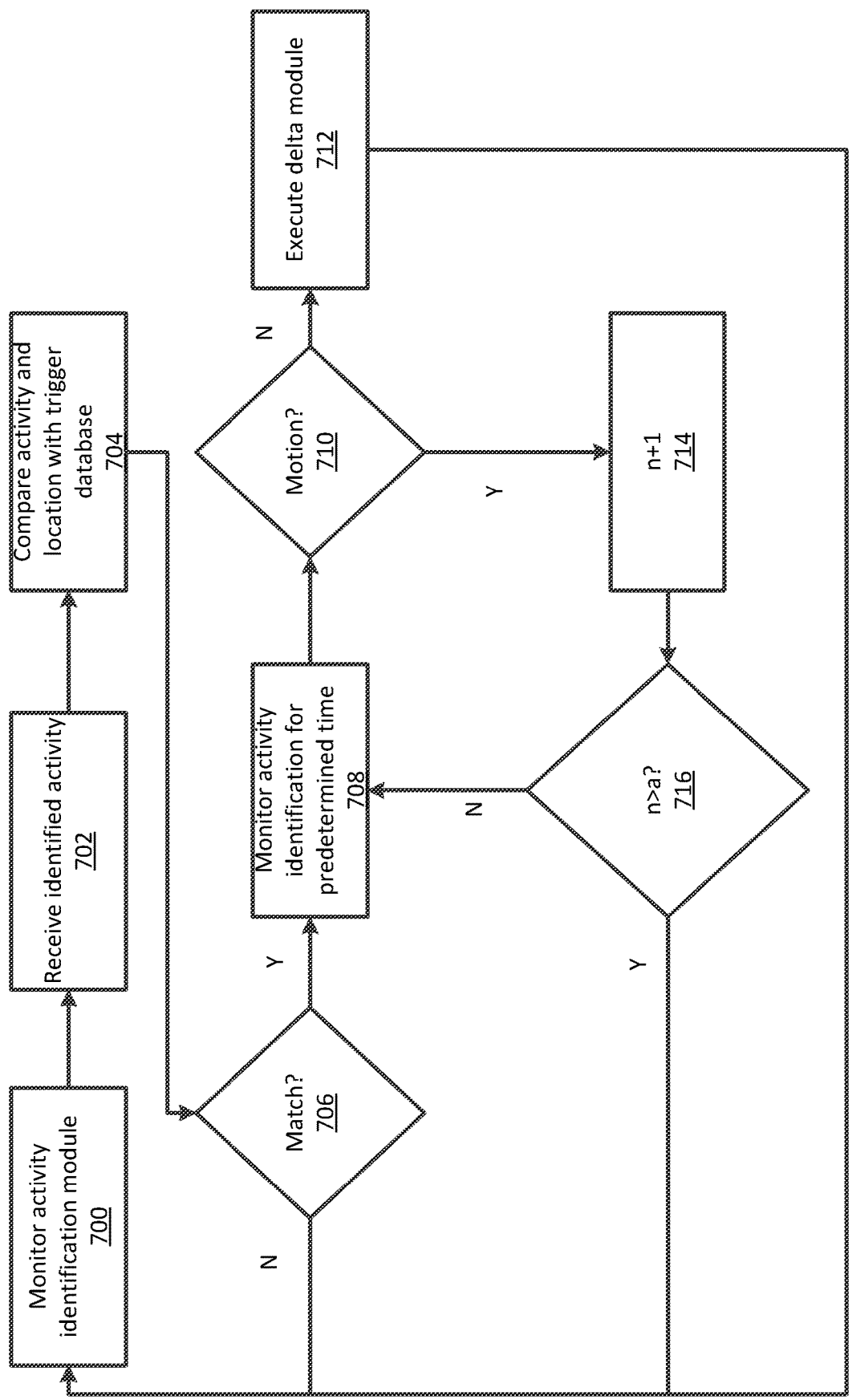
FIG. 7 is a flowchart illustrating an exemplary method for motion-based triggers.

FIG. 7 is a flowchart illustrating an exemplary method for motion-based triggers. Such method may be performed based on execution of trigger module 138. The process begins when the trigger module 138 is initiated by the base module 136 when the system is activated. The trigger module 138 begins to monitor the activity identification module 118 for output of identified activities at step 700. As one example, the activity identification module 118 may identify the activity of lying down in the bedroom which the trigger module 138 would see from monitoring the activity identifications modules 118 output.

The trigger module 138 then receives the identified activity from the activity identification module 118, such as the activity of "lying down in the bedroom" at step 702. The module then compares the received activity (i.e., lying down) and the location of the activity (i.e., bedroom) with the trigger database 130 to see if there is a match at step 704.

At step 706, the trigger module 138 determines if the current activity matches the trigger database 130. If the current activity received from the activity identification module 118 doesn't match any of the activities in the trigger database 130 at step 706, the module returns to step 700 and continues to monitor the activity identification module 118.

If there is a match in the trigger database 130, the system then continues to monitor the activity identification module 118 for a predetermined time period (e.g., 30 seconds) to determine if there is still motion or not at step 708. The purpose of monitoring for a predetermined time period after a trigger activity has happened is to make sure a person didn't just lie down and then get right back up again. If there is still motion detected at step 710, the system will continue to monitor for a predetermined time period one or more times until there is no motion.

If there is still motion detected the trigger module 138 moves to step 714. At step 714, the counter is increased by one, where "n" is the counter and "n" equals the number of times the module has monitored for motion at step 714. If motion is still detected, the trigger module 138 will continue to monitor for motion for a predetermined time period before restarting at step 700. As one example, the trigger module 138 may continue to monitor for motion for three 30 second periods. The module then checks "n" to see how many times it has already monitored for motion.

At step 716, the trigger module 138 determines if it has already monitored for motion more than a predetermined amount of times, where "a" is any constant and represents the predetermined threshold for the amount of times the module has already monitored for motion. If the trigger module 138 has monitored for motion more than "a" times the module returns to step 700 and begins monitoring the activity identification module 118 again. This suggests that the user may have started another activity after the trigger activity. At step 716, "n" is less than the predetermined constant "a" the module returns to step 708 to begin monitoring for motion for a predetermined time period again. If there is no motion detected at step 710, the trigger module 138 moves to step 712 and executes the delta module 140.

Once the delta module 140 has ended, the trigger module 138 returns to step 700 to begin monitoring the activity identification module 118.

Figure 8:
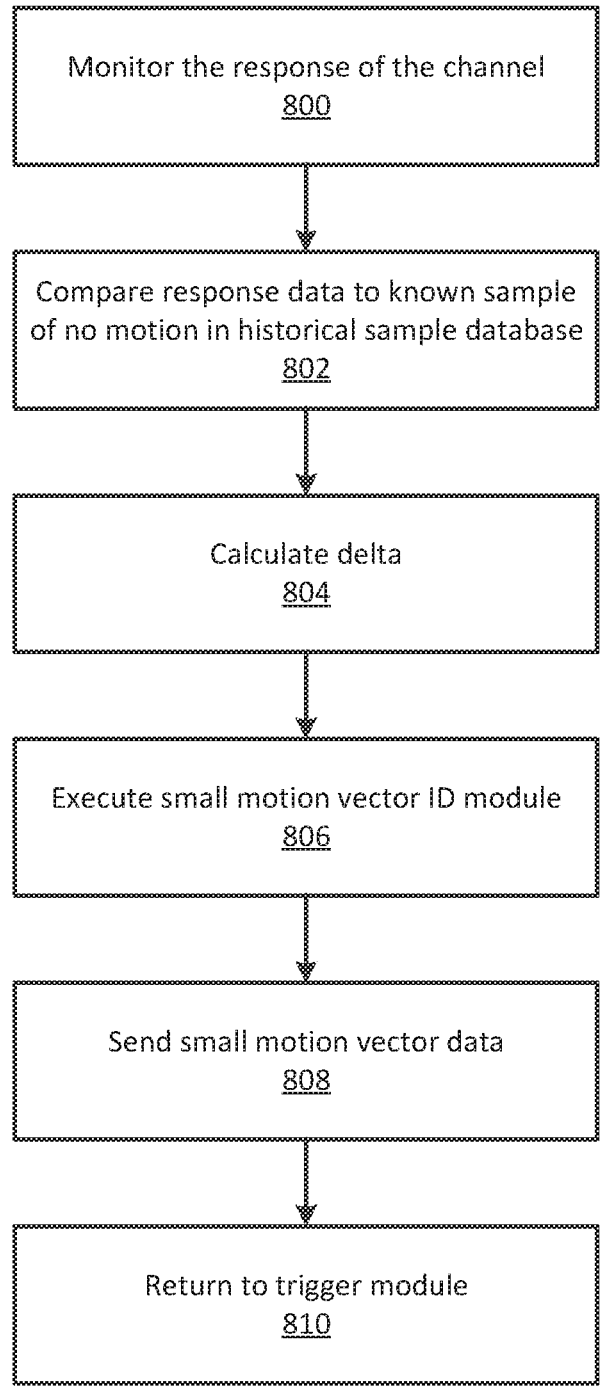
FIG. 8 is a flowchart illustrating an exemplary method for identifying motion deltas.

FIG. 8 is a flowchart illustrating an exemplary method for identifying motion deltas. Such method may be performed based on execution of delta module 140. The process begins with the delta module 140 monitoring the response of the channel once it is executed by the trigger module 138 at step 800. As one example, the trigger action of lying down in the bedroom was the identified trigger action and there was no motion detected for at least 30 seconds. The data that the delta module 140 will be monitoring will look as if there is no motion. The monitored response data is then compared to a known sample of no motion from the historical sample database 128 at step 802.

The delta of the monitored data and historical sample data is calculated at step 804. The delta between the two, the monitored data and historical sample data, is the detected small motion vectors with in the target environment. Any variations from a known historical sample of known no motion data can be assumed to be small motion vectors. Once the small motion vector has been determined the small motion vector ID module 142 is executed at step 806. The new determined small motion vector data is then sent to the small motion vector ID module 142 at step 808. The delta module 140 then ends and returns to the trigger module 138 at step 810.

Figure 9:
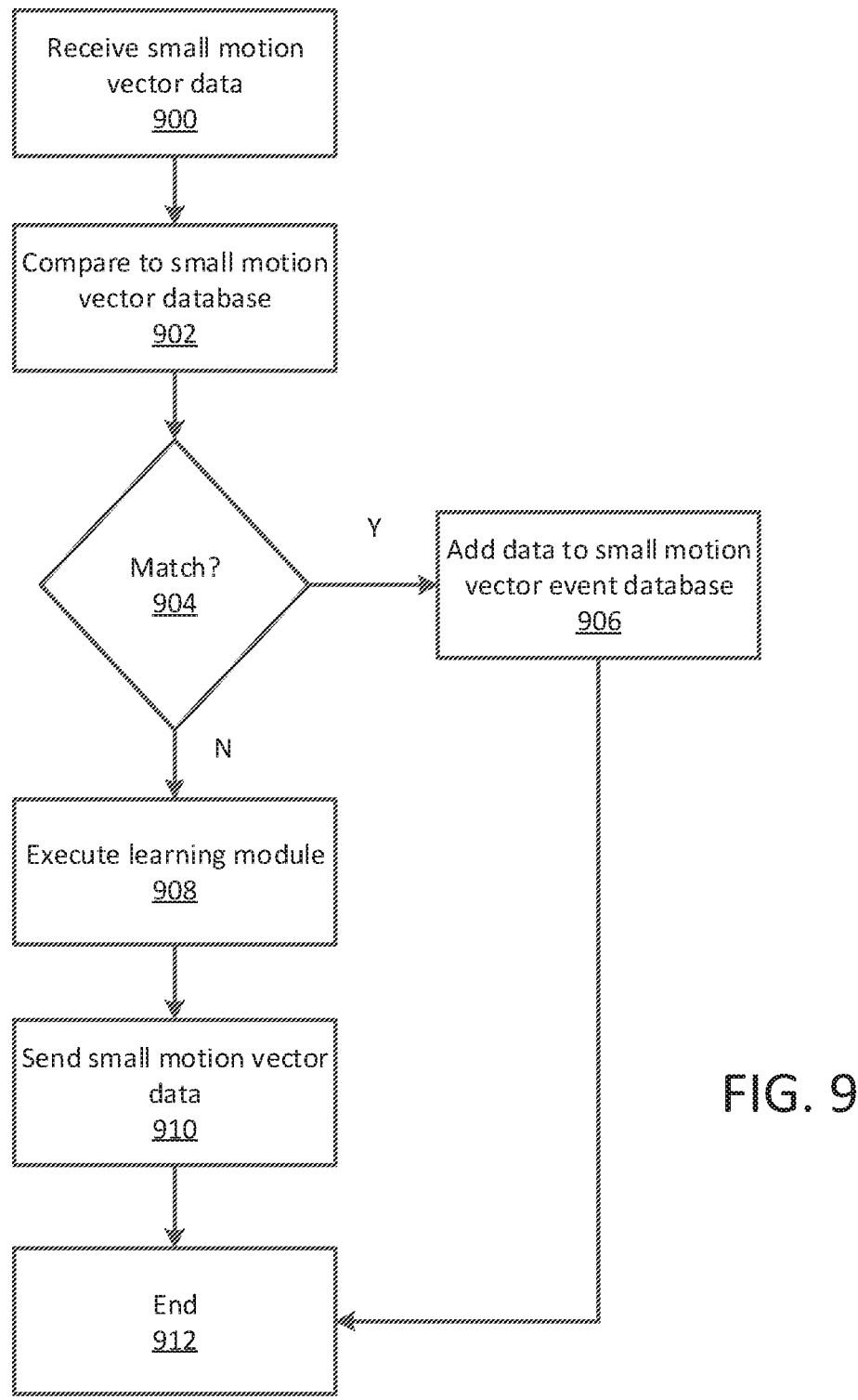
FIG. 9 is a flowchart illustrating an exemplary method for small motion vector identification.

FIG. 9 is a flowchart illustrating an exemplary method for small motion vector identification. Such method may be performed based on execution of a small motion vector ID module 142. The process begins when the small motion vector ID module 142 is executed and receives the small motion vector data from the delta module 140 at step 900. The small motion vector data is then compared to the small motion vector database to identify what the small motion vector is or what the small motion vector activity is at step 902. As one example, the small motion vector may be the slight movement of a person breathing while lying in bed at night. If the small motion vector data matches data in the small motion vector database 132 at step 904, the small motion vector activity that matches is added to the small motion vector event database 134 at step 906. As one example, the small motion vector data may match the small motion vector activity of breathing while lying in bed at night. If there is a match, then the small motion vector data, the small motion vector activity, time, date and location are all added to the small motion vector event database 134 at step 906. If there is not a match, then the module executes the learning module 144 at step 908. Once the learning module 144 is executed the small motion vector data is sent to the learning module at step 910. The small motion vector ID module 142 ends at step 912.

Figure 10:
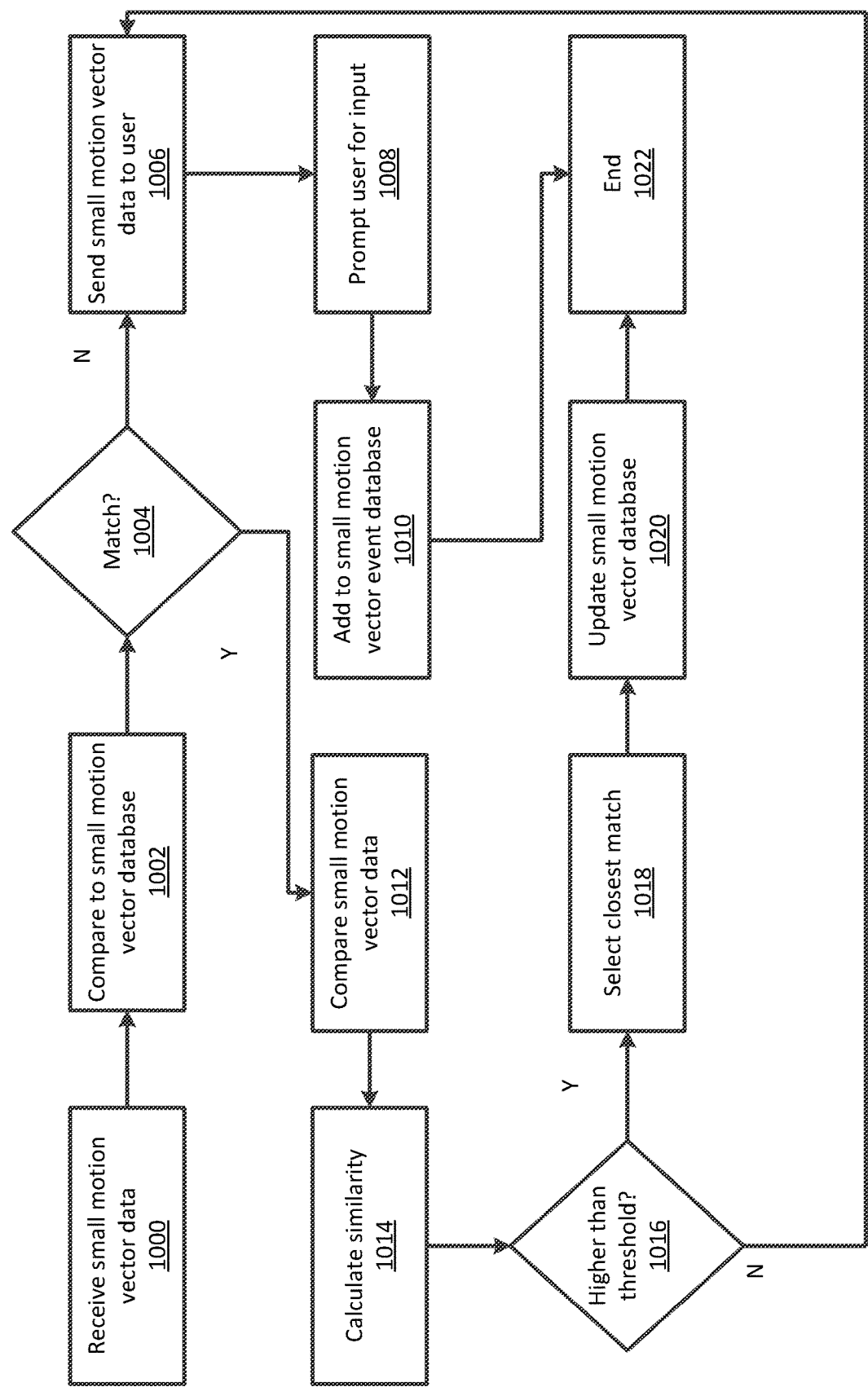
FIG. 10 is a flowchart illustrating an exemplary method for small motion learning.

FIG. 10 is a flowchart illustrating an exemplary method for small motion learning. Such method may be performed based on execution of learning module 144. The process begins when the learning module 144 is first executed by the small motion vector ID module 142 and receives the small motion vector data at step 1000. The data includes, but is not limited to, the calculated small motion vector data, time, location and preceding trigger activity. The learning module 144 then compares the associated small motion vector data (i.e., trigger activity, location, time, etc.) to the small motion vector database 132 to find the closest match at step 1002.

As one example, the matching record can be found by first searching and then matching the provided fields and returning the records that match in step 1004. If there were no matches found in step 1004, a quantitative field would be expanded to a range, such as, a time could have a range of +/−2 hours rather than an exact match. If the query returns no matches all of the small motion vector data is sent to a user for input. If 1 or more matches are found, the learning module 144 then finds the closest record with matching small motion vector data. If no matches are found, the user is then sent all of the small motion vector data to provide input and context of what the small motion vector data activity is at step 1006.

The user is then prompted on a user device or user interface to help identify the small motion vector at step 1008. In some cases, the user may not be able to identify the small motion vector activity in which case the data may be stored as an unknown activity and can be identified at a later date. The user's input and the small motion vector data are all added to small motion vector event database 132 at step 1010. If there are matches returned from the query, the module begins to compare the small motion vector data (i.e., impulse response data) with the stored small motion vector data of the records returned to determine how close the small motion vector data compares at step 1012.

The learning module 144 then calculates the similarity of the small motion vector data and the stored small motion vector data at step 1014. The result could be a percentage of how similar the two points or data are. At step 1016, it is determined if any of the selected data from the small motion vector database has a match that is higher than a certain predetermined percentage of similarity (e.g., 80%).

If there are any matches that are higher than a certain predetermined percentage of similarity then the learning module 144 selects the closest match at step 1018. If there are no matches that are higher than a certain predetermined percentage of similarity, then the data is sent to the user at step 1006, and the user is prompted to decide which is the best match at step 1008. The stored small motion vector data that is the closest match (i.e., the highest percentage of similarity) is selected at step 1018.

The small motion vector database 132 is then updated with the new small motion vector data adding to the current data to improve future results at step 1020. Once the small motion vector database 132 is updated, the learning module 144 ends at step 1022.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for detecting motion vectors, the method comprising:
    receiving indication of an identified activity, the indication based on data collected by a wireless access point that monitors a target environment;
    comparing the identified activity to one or more activities stored in a trigger database, wherein at least one of the stored activities include a period of no motion;
    determining that the identified activity matches the at least one of the stored activities;
    receiving response data regarding a predetermined time period following the identified activity within the target environment;
    calculating a delta between the response data and each of one or more sets of historical response data indicative of no motion, the one or more sets stored in a historical sample database; and
    identifying that the response data is indicative of a motion activity based on comparing the calculated delta to one or more sets of motion vector activity data stored in a motion vector database.

2. The method of claim 1, wherein identifying that the response data is indicative of the motion activity is further based on an exact match to at least one of the sets of motion vector activity data in the motion vector database, and further comprising adding the response data to the at least one set of motion vector activity data in the motion vector database.

3. The method of claim 1, wherein identifying that the response data is indicative of the motion activity is further based on an inexact match to at least one of the sets of motion vector activity data in the motion vector database, the inexact match associated with an identified similarity percentage above a predetermined threshold, and further comprising adding the response data to the at least one set of motion vector activity data in the motion vector database based on the identified similarity percentage.

4. The method of claim 3, further comprising identifying the inexact match to the at least one set, wherein identifying the inexact match comprises:
    calculating a similarity percentage measuring similarity of data points between the response data and each of the sets of motion vector activity data in the motion vector database;
    identifying one or more of the similarity percentages that are above the predetermined threshold; and
    selecting the at least one set of motion vector activity data based on the identified similarity percentage being the highest similarity percentage among the identified similarity percentages.

5. The method of claim 1, wherein identifying that the response data is indicative of the motion comprises:
    identifying that the response data does not match any of the sets of motion vector activity data in the motion vector database;
    prompting a user device to identify a motion vector activity associated with the response data;
    receiving an identification for the motion vector activity from the user device; and
    adding a new set of motion vector activity data associated with the identified motion vector activity to the motion vector database, the new set including the response data.

6. The method of claim 5, wherein the new set of motion vector activity data is initially added in association with an unknown activity indicator to the motion vector database, and wherein adding the new set includes updating the unknown activity based on the identification from the user device.

7. The method of claim 1, wherein the response data includes a location, time, and trigger activity associated with the identified motion activity.

8. A system for detecting motion vectors, the system comprising:
    a wireless access point located in a target environment, wherein the wireless access point monitors the target environment; and
    a cloud server that:
        receives indication of an identified activity, the indication based on data collected by the wireless access point;
        compares the identified activity to one or more activities stored in a trigger database, wherein at least one of the stored activities include a period of no motion;
        determines that the identified activity matches the at least one of the stored activities;
        receives response data regarding a predetermined time period following the identified activity within the target environment;
        calculates a delta between the response data and each of one or more sets of historical response data indicative of no motion, the one or more sets stored in a historical sample database; and
        identifies that the response data is indicative of a motion activity based on comparing the calculated delta to one or more sets of motion vector activity data stored in a motion vector database.

9. The system of claim 8, wherein the cloud server identifies that the response data is indicative of the motion activity further based on an exact match to at least one of the sets of motion vector activity data in the motion vector database, and wherein the cloud server further adds the response data to the at least one set of motion vector activity data in the motion vector database.

10. The system of claim 8, wherein the cloud server identifies that the response data is indicative of the motion activity further based on an inexact match to at least one of the sets of motion vector activity data in the motion vector database, the inexact match associated with an identified similarity percentage above a predetermined threshold, and wherein the cloud server further adds the response data to the at least one set of motion vector activity data in the motion vector database based on the identified similarity percentage.

11. The system of claim 10, wherein the cloud server further identifies the inexact match to the at least one set, wherein the cloud server identifies the inexact match by:
    calculating a similarity percentage measuring similarity of data points between the response data and each of the sets of motion vector activity data in the motion vector database;
    identifying one or more of the similarity percentages that are above the predetermined threshold; and selecting the at least one set of motion vector activity data based on the identified similarity percentage being the highest similarity percentage among the identified similarity percentages.

12. The system of claim 8, wherein the cloud server identifies that the response data is indicative of the motion activity by:
   identifying that the response data does not match any of the sets of motion vector activity data in the motion vector database;
   prompting a user device to identify a motion vector activity associated with the response data;
   receiving an identification for the motion vector activity from the user device; and
   adding a new set of motion vector activity data associated with the identified motion vector activity to the motion vector database, the new set including the response data.

13. The system of claim 12, wherein the new set of motion vector activity data is initially added in association with an unknown activity indicator to the motion vector database, and wherein the cloud server adds the new set by updating the unknown activity based on the identification from the user device.

14. The system of claim 8, wherein the response data includes a location, time, and trigger activity associated with the identified motion activity.

15. A non-transitory, computer-readable storage medium, having embodied thereon a program executable by a processor to perform a method for detecting motion vectors, the method comprising:
   receiving indication of an identified activity, the indication based on data collected by a wireless access point that monitors a target environment;
   comparing the identified activity to one or more activities stored in a trigger database, wherein at least one of the stored activities include a period of no motion;
   determining that the identified activity matches the at least one of the stored activities;
   receiving response data regarding a predetermined time period following the identified activity within the target environment;
   calculating a delta between the response data and each of one or more sets of historical response data indicative of no motion, the one or more sets stored in a historical sample database; and
   identifying that the response data is indicative of a motion activity based on comparing the calculated delta to one or more sets of motion vector activity data stored in a motion vector database.

* * * * *